United States Patent
Han et al.

(10) Patent No.: US 12,039,779 B2
(45) Date of Patent: Jul. 16, 2024

(54) METHOD AND SYSTEM FOR WHOLE-PROCESS TRACE LEAVING OF VIDEO MANUSCRIPT GATHERING, EDITING, AND CHECK

(71) Applicant: SHANDONG SHUNNET MEDIA CO., LTD., Shandong (CN)

(72) Inventors: Qiang Han, Jinan (CN); Bin Li, Jinan (CN); Jinzeng Yang, Jinan (CN); Wenwen Zhou, Jinan (CN); Ziyang Zhang, Jinan (CN); Guangqing Li, Jinan (CN)

(73) Assignee: SHANDONG SHUNNET MEDIA CO., LTD., Jinan (CN)

( * ) Notice: Subject to any disclaimer, the term of this patent is extended or adjusted under 35 U.S.C. 154(b) by 433 days.

(21) Appl. No.: 17/602,221

(22) PCT Filed: Feb. 25, 2021

(86) PCT No.: PCT/CN2021/077919
§ 371 (c)(1),
(2) Date: Oct. 7, 2021

(87) PCT Pub. No.: WO2022/007419
PCT Pub. Date: Jan. 13, 2022

(65) Prior Publication Data
US 2022/0189172 A1    Jun. 16, 2022

(30) Foreign Application Priority Data
Jul. 9, 2020    (CN) .......................... 202010658349.X

(51) Int. Cl.
G06V 20/40    (2022.01)
H04L 9/00    (2022.01)
(Continued)

(52) U.S. Cl.
CPC ............ *G06V 20/46* (2022.01); *H04L 9/0825* (2013.01); *H04L 9/3297* (2013.01);
(Continued)

(58) Field of Classification Search
None
See application file for complete search history.

(56) References Cited

U.S. PATENT DOCUMENTS 6,473,095 B1 *  10/2002  Martino ................. G06V 20/40
                                                    348/700
9,549,188 B2 *   1/2017  Zhang ................... H04N 19/142
(Continued)

FOREIGN PATENT DOCUMENTS

CN    101894125 A    11/2010
CN    107580196 A     1/2018
(Continued)

OTHER PUBLICATIONS

Mar. 30, 2021 Office Action issued in Chinese Patent Application No. 202010658349.X.
(Continued)

*Primary Examiner* — Vu Le
*Assistant Examiner* — Charles C L Penny
(74) *Attorney, Agent, or Firm* — Oliff PLC

(57) ABSTRACT

A method for whole-process trace leaving of video manuscript gathering, editing, and check, including: extracting a key frame from video clipping information, generating histogram data by using the key frame, and obtaining video modification information based on the histogram data; and on-chaining, by using timestamps as blockchain nodes, the video modification information completed at different time points to form a trace chain arranged according to the timestamp, to implement whole-process trace leaving for video clipping. The technical solutions of the present inven-
(Continued)

tion resolve a difficulty in whole-process trace leaving for video manuscript editing and issuing, and in addition, by using the blockchain techniques, implement tamper-proofing and security of trace information, thereby effectively improving security of gathering and editing in the media industry.

10 Claims, 1 Drawing Sheet

(51) Int. Cl.

| | | |
|---|---|---|
| *H04L 9/08* | (2006.01) | |
| *H04L 9/32* | (2006.01) | |
| *H04N 21/234* | (2011.01) | |
| *H04N 21/2347* | (2011.01) | |
| *H04N 21/845* | (2011.01) | |
| *H04N 21/854* | (2011.01) | |
| *H04N 21/8547* | (2011.01) | |

(52) U.S. Cl.
CPC ....... *H04N 21/234* (2013.01); *H04N 21/2347* (2013.01); *H04N 21/8456* (2013.01); *H04N 21/8547* (2013.01); *H04L 9/50* (2022.05); *H04L 2209/463* (2013.01); *H04N 21/854* (2013.01)

(56) References Cited

U.S. PATENT DOCUMENTS

| | | | |
|---|---|---|---|
| 9,870,508 B1* | 1/2018 | Hodgson | H04N 21/2347 |
| 10,880,619 B2* | 12/2020 | Jordan | G11B 27/031 |
| 2013/0182767 A1* | 7/2013 | Xie | H04N 21/44008 |
| | | | 375/240.13 |
| 2019/0361869 A1 | 11/2019 | Krabbenhoft et al. | |
| 2019/0379545 A1* | 12/2019 | Wong | H04L 9/3236 |
| 2020/0159891 A1* | 5/2020 | Patel | G06F 21/16 |
| 2020/0162236 A1* | 5/2020 | Miller | G06F 40/174 |

FOREIGN PATENT DOCUMENTS

| | | |
|---|---|---|
| CN | 108471510 A | 8/2018 |
| CN | 109766673 A | 5/2019 |
| CN | 110377888 A | 10/2019 |
| CN | 110659332 A | 1/2020 |
| CN | 110795755 A | 2/2020 |
| CN | 110955419 A | 4/2020 |
| CN | 111770360 A | 10/2020 |
| WO | 2019/227074 A1 | 11/2019 |

OTHER PUBLICATIONS

May 21, 2021 Written Opinion issued in International Patent Application No. PCT/CN2021/077919.
May 21, 2021 International Search Report issued in International Patent Application No. PCT/CN2021/077919.

\* cited by examiner

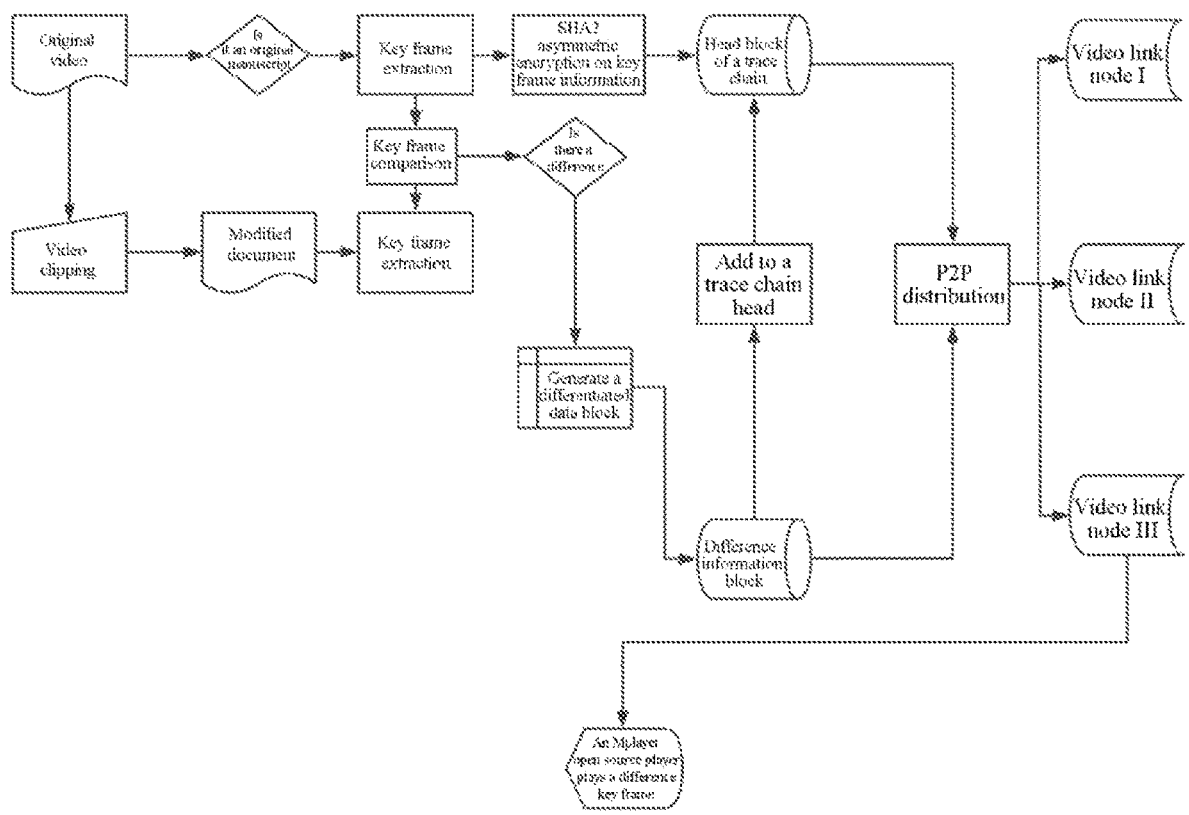

METHOD AND SYSTEM FOR WHOLE-PROCESS TRACE LEAVING OF VIDEO MANUSCRIPT GATHERING, EDITING, AND CHECK

TECHNICAL FIELD

The present invention relates to the field of computer technologies, and in particular, to a method and system for whole-process trace leaving of video manuscript gathering, editing, and check.

BACKGROUND

The description in this section merely provides background information related to the present invention and does not necessarily constitute the prior art.

In an existing conventional video editing and check process, a video features a consecutive image change, and therefore record of traces of video clipping by using a conventional method for recording traces of graphics and manuscripts is not comprehensive and the conventional method cannot be applied to whole-process trace leaving of consecutively video clipping. Manuscript editing information is stored in a conventional database in a conventional manuscript trace leaving method, and therefore, tamper-proofing and security of trace data cannot be guaranteed.

SUMMARY

To overcome the shortcomings in the prior art, the present invention provides a method for whole-process trace leaving of video manuscript gathering, editing, and check, to implement whole-process trace leaving for video clipping.

To achieve the foregoing objective, one or more embodiments of the present invention provide the following technical solutions:

In an aspect, a method for whole-process trace leaving of video manuscript gathering, editing, and check is disclosed, including:

extracting a key frame from video clipping information, generating histogram data by using the key frame, and obtaining video modification information based on the histogram data; and on-chaining, by using timestamps as blockchain nodes, the video modification information completed at different time points to form a trace chain arranged according to the timestamps, to implement whole-process trace leaving for video clipping.

According to a further technical solution, when extracting a key frame from video clipping information, an original video is sliced equally, and a short video key frame image is extracted at a golden section point of each slice.

According to a further technical solution, the extracted short video key frame images are used to generate a histogram data matrix for image differentiation comparison.

According to a further technical solution, the histogram data matrix corresponding to the extracted key frame is encrypted by using an asymmetric encryption technique and is uploaded to the blockchain node to generate an original video block.

According to a further technical solution, key frame extraction is performed on clipped video content and a histogram data matrix is generated, and obtained key frame histogram data is compared with obtained original key frame histogram data, to generate difference information.

According to a further technical solution, the obtained key frame histogram data is compared with the obtained original key frame histogram data, and the difference information is generated if a difference exceeds a specified threshold.

According to a further technical solution, the difference information and the key frame of the clipped video content are combined, to generate a difference data structure.

According to a further technical solution, the difference data structure is encrypted by using an asymmetric encryption technique, to create new blockchains.

According to a further technical solution, the new blockchains are distributed to nodes of at least three other blockchain data centers by using a blockchain P2P network consensus mechanism.

In another aspect, a system for whole-process trace leaving of video manuscript gathering, editing, and check is disclosed, including:

a video modification information obtaining module, configured to extract a key frame from video clipping information, generate histogram data by using the key frame, and obtain video modification information based on the histogram data; and a whole-process trace leaving module for video clipping, configured to on-chain, by using timestamps as blockchain nodes, the video modification information completed at different time points to form a trace chain arranged according to the timestamps, to implement whole-process trace leaving for the video clipping.

The foregoing one or more technical solutions have the following beneficial effects:

In the technical solutions of the present disclosure, realtime saving of video clipping traces is implemented based on blockchain timestamp properties, video clipping information is extracted, and by using blockchain techniques, data is stored to a blockchain and is displayed in a form of a time axis. Data blocks are combined into a chain data structure according to a time sequence in a sequential connection manner, and a blockchain information encryption technique and consensus distributed storage are used to form a whole-process video clipping trace data chain, thereby implementing whole-process trace leaving for video clipping, and avoiding omission of modification information.

The technical solutions of the present disclosure resolve a difficulty in whole-process trace leaving for video manuscript editing and issuing, and in addition, by using the blockchain techniques, implement tamper-proofing and security of trace information, thereby effectively improving security of gathering and editing in the media industry.

BRIEF DESCRIPTION OF THE DRAWINGS

The accompanying drawings constituting a part of the present invention are used to provide a further understanding of the present invention. The exemplary embodiments of the present invention and descriptions thereof are used to explain the present invention, and do not constitute an improper limitation of the present invention.

FIG. 1 is a flowchart according to an embodiment of the present invention.

DETAILED DESCRIPTION

It should be noted that, the following detailed descriptions are all exemplary, and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

The embodiments in the present invention and features in the embodiments may be mutually combined in case that no conflict occurs.

Embodiment 1

As shown in FIG. 1, this embodiment discloses a method for whole-process trace leaving of video manuscript gathering, editing, and check, and the method includes the following steps:

Step (101). An original video is equally sliced and is divided into 100 or more slices according to a length of a short video, to ensure maximum extraction of effective information from the video without losing key information.

Step (102). Due to strict proportionality and harmony of a golden section point, a short video key frame image is extracted at a golden section point of each slice, and the extracted key frame image is used to generate a histogram data matrix for image differentiation comparison.

Step (103). The key frame extracted in step (102) is encrypted by using an asymmetric encryption technique SHA2 and is uploaded to established blockchain nodes to generate an original video block.

Step (104). After a user uploads clipped video content, key frame extraction and histogram data matrix calculation are performed on the video content according to steps (101) and (102).

Step (105). Compare key frame histogram data obtained in step (104) with original key frame histogram data obtained in step (103), and generate difference information if a difference exceeds 10%.

Step (106). Combine the difference information generated in step (105) and a latest key frame obtained in step (104), to generate a difference data structure, including a modification time, an operator, a latest video key frame, difference information, and the like.

Step (107). The data structure generated in step (106) is encrypted by using the asymmetric encryption technique SHA2, to create new blockchains. The blockchain generated herein is a subsequent block of a block generated in step (102), and pertains to a trace chain.

Data blocks generated in step (107) are distributed to nodes of at least three other blockchain data centers by using a blockchain P2P network consensus mechanism.

Step (108). Repeat steps (102) to (107), on-chain video modification information completed at different time points to form a trace chain arranged according to timestamps.

Step (109). Trace chain play is to obtain block data of the entire trace chain generated in step (108) through the original video block generated in step (103).

Step (1091). Traverse the trace chain to obtain video information and a difference key frame from current block data.

Step (1092). Play an original video provided in step (1091) by using an MPlayer open source player.

Step (1093). Interfere with the playing in step (1092) according to the difference key frame obtained in step (1091), and simultaneously play an original key frame and the difference key frame, to provide modification record of video clipping.

An output list of the foregoing steps includes: a video title, a video clipping time, a video source, a video clipping operator, and the like.

In the solutions, a timestamp database based on a blockchain is used, to extract the key frame from video clipping information, and the histogram data is used to obtain clip difference trace data. The timestamps are used as blockchain nodes, clip trace data blocks are combined in a sequential connection manner to form a chain data structure, and data blocks are generated and stored in a blockchain-based timestamp database. In addition, blockchain information encryption technique and consensus distributed storage are used to realize distributed storage of clipping traces, which cannot be tampered with, thereby forming a whole-process video clipping trace data chain, thereby implementing whole-process trace leaving for video clipping.

Embodiment 2

An objective of this embodiment is to provide a computing apparatus, including a memory, a processor, and a computer program stored in the memory and executable on the processor, where when the processor executes the program, steps of the method for whole-process trace leaving of video manuscript gathering, editing, and check in embodiment 1 are implemented.

Embodiment 3

An objective of this embodiment is to provide a computer-readable storage medium.

The computer-readable storage medium stores a computer program, and when the program is executed by a processor, steps of the method for whole-process trace leaving of video manuscript gathering, editing, and check in embodiment 1 are implemented.

Based on the same inventive concept, a system for whole-process trace leaving of video manuscript gathering, editing, and check is further disclosed, including:

a video modification information obtaining module, configured to extract a key frame from video clipping information, generate histogram data by using the key frame, and obtain video modification information based on the histogram data; and a whole-process trace leaving module for video clipping, configured to on-chain, by using timestamps as blockchain nodes, the video modification information completed at different time points to form a trace chain arranged according to the timestamps, to implement whole-process trace leaving for the video clipping.

The steps involved in the apparatus of the foregoing embodiment correspond to method embodiment 1. For a specific implementation, reference may be made to related descriptions of embodiment 1. The term "computer-readable storage medium" should be understood as a single medium or a plurality of media including one or more instruction sets, and should also be understood as including any medium. The any medium can store, encode, or carry an instruction set used for being executed by a processor, and cause the processor to perform any method in the present invention.

A person skilled in the art should understand that the modules or steps in the present invention may be implemented by using a general-purpose computer apparatus. Optionally, they may be implemented by using program code executable by a computing apparatus, so that they may be stored in a storage apparatus and executed by the computing apparatus. Alternatively, the modules or steps are respectively manufactured into various integrated circuit modules, or a plurality of modules or steps thereof are manufactured into a single integrated circuit module. The present invention is not limited to any specific combination of hardware and software.

The above descriptions are merely preferred embodiments of the present invention and are not intended to limit the present invention. A person skilled in the art may make various alterations and variations to the present invention. Any modification, equivalent replacement, or improvement made within the spirit and principle of the present invention shall fall within the protection scope of the present invention.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. A method for whole-process trace leaving of video manuscript gathering, editing, and check, comprising:
   extracting a key frame from video clipping information, generating histogram data by using the key frame, and obtaining video modification information based on the histogram data; and
   on-chaining, by using timestamps as blockchain nodes, the video modification information completed at different time points to form a trace chain arranged according to the timestamps, to implement whole-process trace leaving for video clipping,
   wherein when extracting a key frame from video clipping information, an original video is sliced equally, and a short video key frame image is extracted at a golden section point of each slice; and
   the extracted short video key frame image is used to generate a histogram data matrix for image differentiation comparison.

2. The method for whole-process trace leaving of video manuscript gathering, editing, and check according to claim 1, wherein the histogram data matrix corresponding to the extracted key frame is encrypted by using an asymmetric encryption technique and is uploaded to the blockchain nodes to generate an original video block.

3. The method for whole-process trace leaving of video manuscript gathering, editing, and check according to claim 1, wherein key frame extraction is performed on clipped video content and a histogram data matrix is generated, and obtained key frame histogram data is compared with obtained original key frame histogram data, to generate difference information.

4. The method for whole-process trace leaving of video manuscript gathering, editing, and check according to claim 3, wherein when the obtained key frame histogram data is compared with the obtained original key frame histogram data, the difference information is generated if a difference exceeds a specified threshold.

5. The method for whole-process trace leaving of video manuscript gathering, editing, and check according to claim 4, wherein the difference information and the key frame of the clipped video content are combined, to generate a difference data structure.

6. The method for whole-process trace leaving of video manuscript gathering, editing, and check according to claim 5, wherein the difference data structure is encrypted by using an asymmetric encryption technique, to create new blockchains; and
   the new blockchains are distributed to at least three other blockchain data centers nodes by using a blockchain P2P network consensus mechanism.

7. A computing apparatus, comprising a memory, a processor, and a computer program stored on the memory and executable on the processor, wherein when the processor executes the program, steps of the method for whole-process trace leaving of video manuscript gathering, editing, and check according to claim 1 are implemented.

8. A non-transitory computer-readable storage medium, storing a computer program, wherein steps of the method for whole-process trace leaving of video manuscript gathering, editing, and check according to claim 1 are performed when the program is executed by a processor.

9. A system for whole-process trace leaving of video manuscript gathering, editing, and check, comprising:
   a video modification information obtaining module, configured to extract a key frame from video clipping information, generate histogram data by using the key frame, and obtain video modification information based on the histogram data; and
   a whole-process trace leaving module for video clipping, configured to on-chain, by using timestamps as blockchain nodes, the video modification information completed at different time points to form a trace chain arranged according to the timestamps, to implement whole-process trace leaving for the video clipping,
   wherein when extracting a key frame from video clipping information, an original video is sliced equally, and a short video key frame image is extracted at a golden section point of each slice; and
   the extracted short video key frame image is used to generate a histogram data matrix for image differentiation comparison.

10. The system according to claim 9, wherein the histogram data matrix corresponding to the extracted key frame is encrypted by using an asymmetric encryption technique and is uploaded to the blockchain nodes to generate an original video block.

* * * * *